(12) United States Patent
Harris et al.

(10) Patent No.: US 7,861,615 B2
(45) Date of Patent: Jan. 4, 2011

(54) ADJUSTABLE STEERING COLUMN ASSEMBLY

(75) Inventors: David E. Harris, Birch Run, MI (US); James E. Rouleau, Burt, MI (US); Frederick J. Berg, Auburn, MI (US); Joen C. Bodtker, Flint, MI (US); Shawn A. Haring, Flint, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 319 days.

(21) Appl. No.: 12/114,417

(22) Filed: May 2, 2008

(65) Prior Publication Data

US 2008/0202276 A1     Aug. 28, 2008

Related U.S. Application Data

(63) Continuation-in-part of application No. 11/109,420, filed on Apr. 19, 2005, now abandoned.

(51) Int. Cl.
*B62D 1/18* (2006.01)
(52) U.S. Cl. .......................................... 74/493; 280/775
(58) Field of Classification Search ................... 74/492, 74/493; 280/775
See application file for complete search history.

(56) References Cited

U.S. PATENT DOCUMENTS

| | | | |
|---|---|---|---|
| 2,153,998 | A | 4/1939 | Verderber et al. |
| 3,711,139 | A | 1/1973 | Polk, Jr. |
| 4,244,237 | A * | 1/1981 | Sprunger ..................... 74/493 |
| 4,732,050 | A | 3/1988 | Vollmer |
| 5,301,567 | A | 4/1994 | Snell et al. |
| 5,722,299 | A | 3/1998 | Yamamoto et al. |
| 5,829,311 | A | 11/1998 | Roberson |

(Continued)

FOREIGN PATENT DOCUMENTS

EP     1070652 A2     1/2001

(Continued)

OTHER PUBLICATIONS

"Rake and Telescope Steering Column With Gear Locking Teeth", filed Dec. 13, 2006, U.S. Appl. No. 11/638,132.

(Continued)

*Primary Examiner*—Richard W Ridley
*Assistant Examiner*—Terence Boes
(74) *Attorney, Agent, or Firm*—Cantor Colburn LLP

(57) ABSTRACT

A steering column assembly having a column jacket defining a longitudinal axis and moveable in a telescoping direction and a tilting direction is disclosed. A first bracket defines a telescoping slot having a first tooth rack extending parallel to the longitudinal axis. A second bracket defines a tilting slot having a second tooth rack extending transverse to the telescoping slot. A first locking member and a second locking member are moveable along a pivot axis transverse the longitudinal axis between a locked position and an unlocked position. The locking members have a first locking surface parallel to the longitudinal axis and a second locking surface transverse to the longitudinal and pivot axes. The locking surfaces are disposed in the telescoping and tilting slots, respectively when in the locked position such that the locking surfaces engage the first and second tooth racks, respectively for preventing movement of the column jacket.

18 Claims, 5 Drawing Sheets

U.S. PATENT DOCUMENTS

| | | |
|---|---|---|
| 5,931,501 A | 8/1999 | Baumann et al. |
| 6,139,057 A | 10/2000 | Olgren et al. |
| 6,237,438 B1 | 5/2001 | Ben Rhouma et al. |
| 6,314,829 B1 | 11/2001 | Appleyard |
| 6,419,269 B1 * | 7/2002 | Manwaring et al. ......... 280/775 |
| 6,616,185 B2 | 9/2003 | Manwaring et al. |
| 6,659,504 B2 | 12/2003 | Riefe |
| 6,761,376 B2 | 7/2004 | Riefe et al. |
| 6,792,824 B2 | 9/2004 | Jolley et al. |
| 6,830,267 B2 | 12/2004 | Budaker et al. |
| 6,886,859 B2 | 5/2005 | Braun et al. |
| 7,055,860 B2 | 6/2006 | Armstrong et al. |
| 7,178,422 B2 | 2/2007 | Armstrong et al. |
| 2001/0042420 A1 | 11/2001 | Danielsson |
| 2003/0103805 A1 | 6/2003 | Braun et al. |
| 2005/0016315 A1 | 1/2005 | Breuss et al. |
| 2005/0092124 A1 | 5/2005 | Gaertner et al. |
| 2006/0021460 A1 * | 2/2006 | Schulz ....................... 74/493 |
| 2006/0230863 A1 | 10/2006 | Rouleau et al. |
| 2007/0170711 A1 | 7/2007 | Bechtel et al. |

FOREIGN PATENT DOCUMENTS

| | | |
|---|---|---|
| EP | 1375296 A1 | 1/2004 |
| EP | 1612121 A1 | 1/2006 |
| GB | 2327257 | 1/1999 |
| GB | 2350329 | 11/2000 |
| JP | 3227754 | 10/1991 |

OTHER PUBLICATIONS

"Adjustable Steering Column Assembly Having a Rake and Telescope Locking System", filed May 10, 2007, U.S. Appl. No. 11/801,546.

European Search Report and Office Action dated Dec. 18, 2009 for European Application No. 09158470.6.

* cited by examiner

ADJUSTABLE STEERING COLUMN ASSEMBLY

CROSS REFERENCE TO RELATED APPLICATION

This application is a Continuation-In-Part of U.S. Non-Provisional patent application Ser. No. 11/109,420 filed Apr. 19, 2005, in which all of its contents are incorporated by reference in its entirety.

BACKGROUND OF THE INVENTION

1. Field of the Invention

The present invention relates to an adjustable steering column assembly for a vehicle.

2. Description of the Prior Art

Vehicles may be equipped with an adjustable steering column assembly for adjusting a position of a steering wheel to enhance the comfort and safety for a user. For example, the assembly includes a column jacket moveable in a telescoping direction for moving the steering wheel closer to and away from the user. Also, the column jacket may move in a tilting direction for moving the steering wheel up and down relative to the user. These features cooperate to enable the user to adjust the steering wheel to a desired, convenient position for operating the vehicle and for moving the steering wheel out of the way to provide greater access to getting into and out of the driver's seat of the vehicle.

Many of these adjustable steering column assemblies include a first bracket having a pair of first aims coupled to the column jacket with each of the first arms defining a telescoping slot extending substantially parallel to a longitudinal axis with the telescoping slot having a first tooth rack. A second bracket is disposed about the first bracket and includes a pair of second arms each defining a tilting slot substantially transverse to the telescoping slot with the tilting slot having a second tooth rack. A pivot shaft is disposed through the telescoping and tilting slots of each of the first and second arms along a pivot axis transverse to the longitudinal axis.

A first locking member and a second locking member are mounted to the pivot shaft and moveable about the pivot axis between a locked position for preventing movement of the column jacket in the telescoping and tilting directions and an unlocked position for allowing movement of the column jacket in the telescoping and tilting directions. Each of the first and second locking members include a plurality of teeth for cooperating with the first and second tooth racks. However, the first and second locking members must move in multiple degrees of freedom for properly engaging the teeth of the first and second locking members with the first and second tooth racks, respectively. Having the first and second locking members moving in multiple degrees of freedom requires a complex mechanism to ensure that the teeth of the first and second locking members properly cooperate with the first and second tooth racks.

SUMMARY OF THE INVENTION AND ADVANTAGES

The present invention provides for an adjustable steering column assembly for a vehicle having a column jacket defining a longitudinal axis and moveable in a telescoping direction and a tilting direction. A first bracket having a pair of first arms is coupled to the column jacket. Each of the first arms define a telescoping slot extending substantially parallel to the longitudinal axis with the telescoping slot having a first tooth rack. A second bracket is disposed about the first bracket and includes a pair of second arms each defining a tilting slot extending substantially transverse to and spaced from the telescoping slot with the tilting slot having a second tooth rack. A pivot shaft defines a pivot axis substantially transverse to the longitudinal axis with the pivot shaft disposed through the telescoping and tilting slots of each of the first and second arms along the pivot axis. A first locking member and a second locking member are mounted to the pivot shaft and moveable along the pivot axis between a locked position for preventing movement of the column jacket in the telescoping and tilting directions and an unlocked position for allowing movement of the column jacket in the telescoping and tilting directions. The first and second locking members each have a first locking surface substantially parallel to the longitudinal axis and a second locking surface substantially transverse to the longitudinal and pivot axes. The first and second locking surfaces are disposed in the telescoping and tilting slots, respectively when in the locked position such that the first locking surface of each of the first and second locking members engage the first tooth rack of each of the first arms and the second locking surface of each of the first and second locking members engage the second tooth rack of each of the second arms for preventing movement of the column jacket in the telescoping and tilting directions.

The present invention also provides for an adjustable steering column assembly for a vehicle having a column jacket defining a longitudinal axis and moveable in a telescoping direction and a tilting direction. A first bracket having a pair of first arms is coupled to the column jacket. At least one of the first arms defines a telescoping slot extending substantially parallel to the longitudinal axis with the telescoping slot having a first tooth rack. A second bracket is disposed about the first bracket and includes a pair of second arms. At least one of the second arms defines a tilting slot extending substantially transverse to and spaced from the telescoping slot with the tilting slot having a second tooth rack. A pivot shaft defines a pivot axis substantially transverse to the longitudinal axis with the pivot shaft disposed through the first and second arms along the pivot axis. A locking member is mounted to the pivot shaft and moveable along the pivot axis between a locked position for preventing movement of the column jacket in the telescoping and tilting directions and an unlocked position for allowing movement of the column jacket in the telescoping and tilting directions. The locking member includes a first locking surface substantially parallel to the longitudinal axis and a second locking surface substantially transverse to the longitudinal and pivot axes. The first and second locking surfaces are disposed in the telescoping and tilting slots, respectively when in the locked position such that the first locking surface of the locking member engage the first tooth rack and the second locking surface of the locking member engage the second tooth rack for preventing movement of the column jacket in the telescoping and tilting directions.

The present invention therefore provides for an adjustable steering column assembly having a locking member moveable in a telescoping slot and a tilting slot along a pivot axis. More specifically, the assembly includes a first locking member and a second locking member moveable in the telescoping and tilting slots along the pivot axis. The first and second locking members move in one degree of freedom thus eliminating components to reduce the complexity of the assembly design. In other words, the first and second locking members only move along the pivot axis. The first and second locking members move toward and away from each other between a second bracket which allows for a more compact adjustable steering column assembly and protects the first and second locking members.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, an adjustable steering column assembly 20 for a vehicle (not shown) is generally shown in FIGS. 1-4.

The adjustable steering column assembly 20 includes a column jacket 22 defining a longitudinal axis L and moveable in a telescoping direction and a tilting direction. A steering wheel (not shown) is coupled to the column jacket 22 for allowing a user to adjust the column jacket 22 in the telescoping and tilting directions. The column jacket 22 moves substantially parallel to the longitudinal axis L for the telescoping direction and substantially transverse to the longitudinal axis L for the tilting direction. In other words, the steering wheel moves closer to and away from the user when adjusting the telescoping direction and the steering wheel moves up and down relative to the user when adjusting the tilting direction. Typically, the column jacket 22 moves in both the telescoping and tilting directions. However, it is to be appreciated that the column jacket 22 may move only in the telescoping direction or only in the tilting direction.

Figure 1:
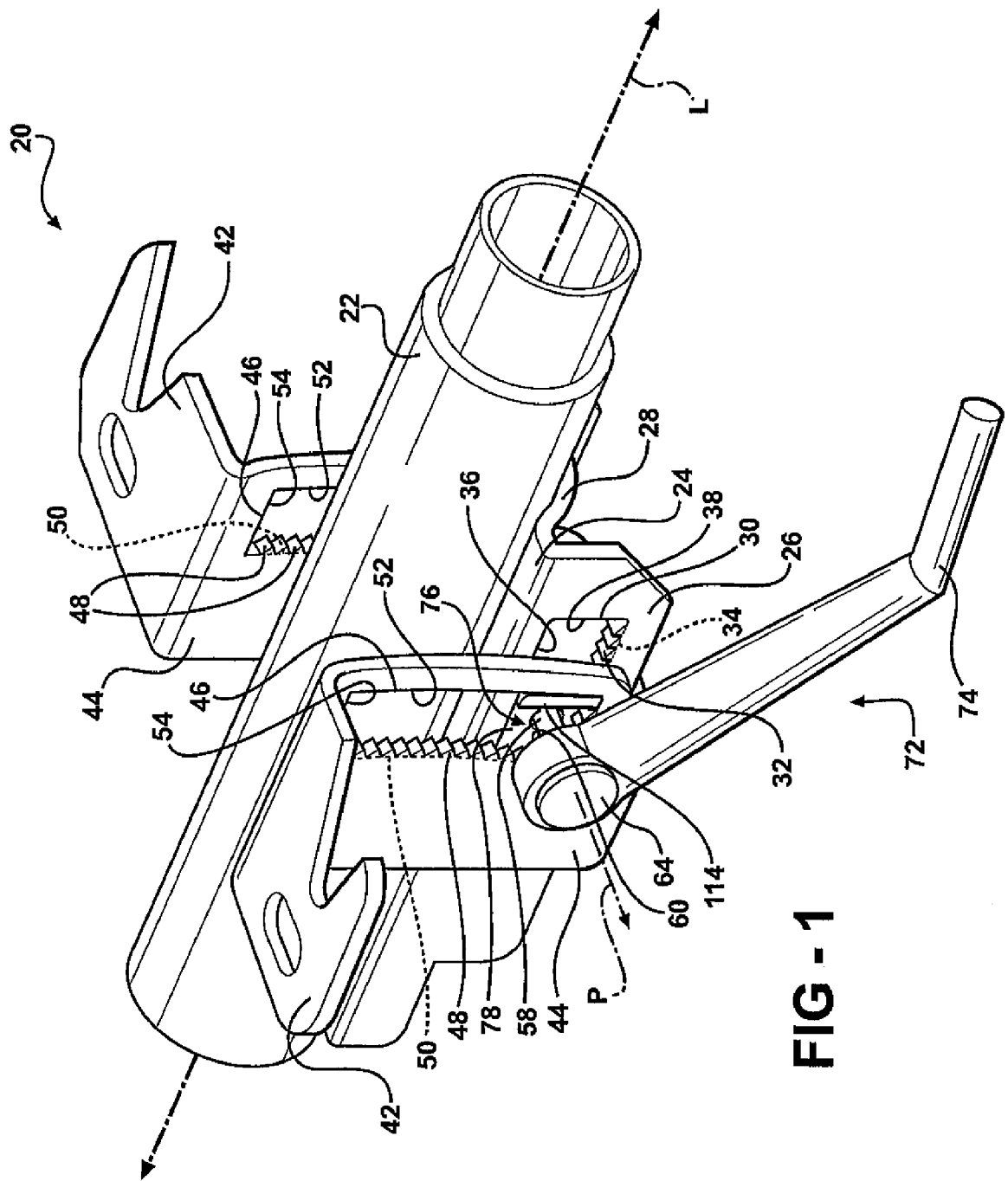
FIG. 1 is a perspective view of an adjustable steering column assembly having a lever in an adjustable position with a cam-follower mechanism removed.
Figure 2:
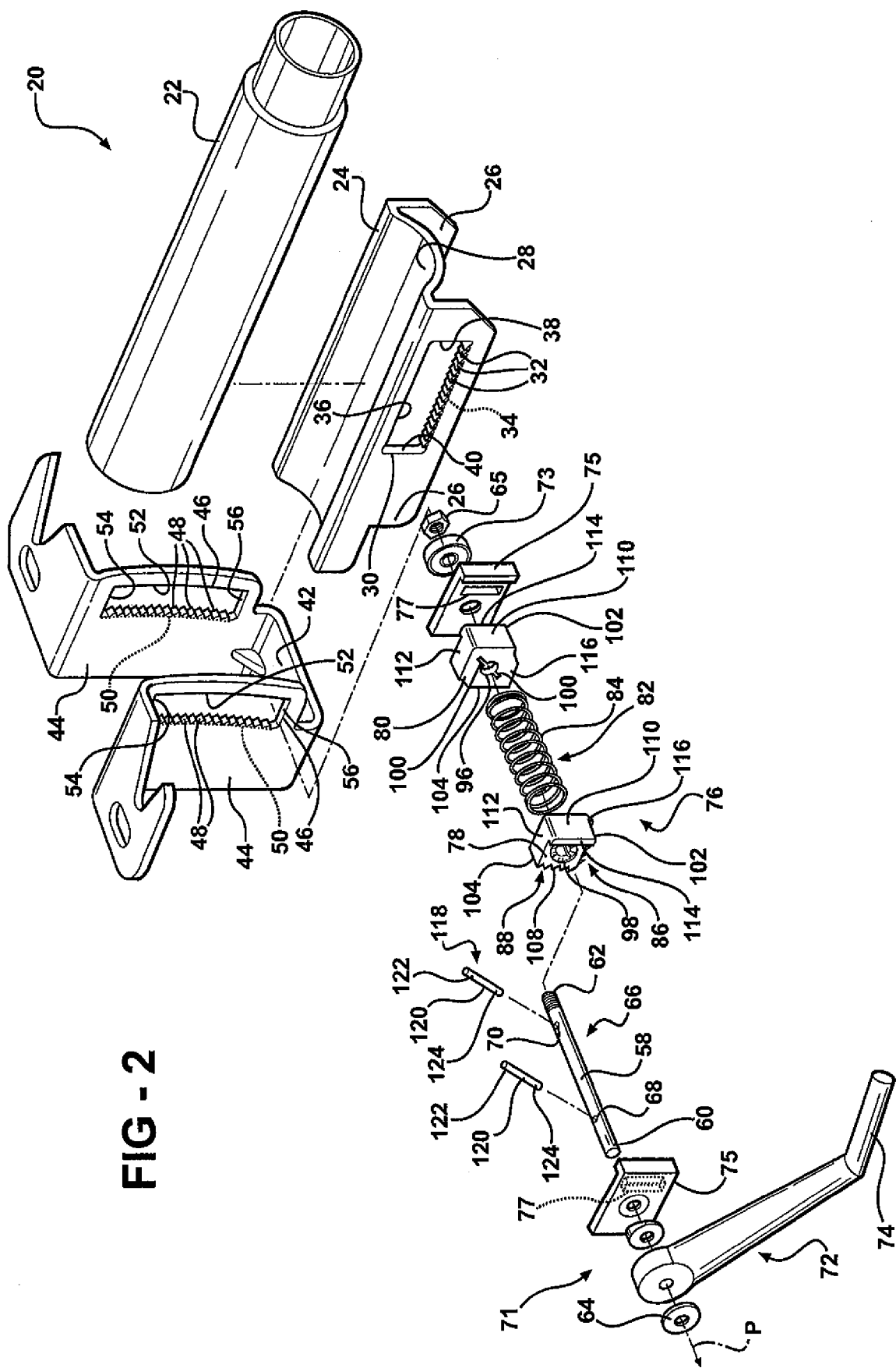
FIG. 2 is an exploded view of the adjustable steering column assembly.
Figure 3:
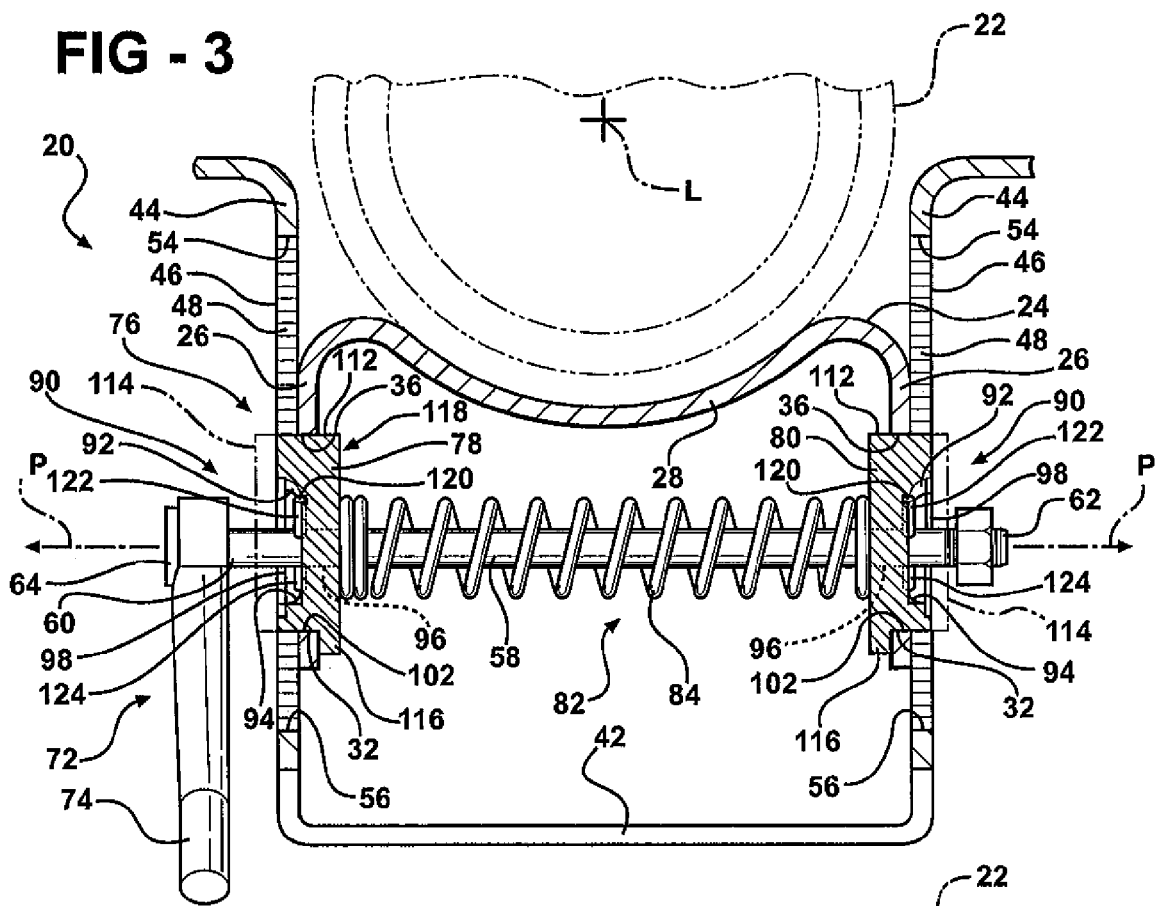
FIG. 3 is a partial cross-sectional view of the adjustable steering column assembly having a first locking member and a second locking member in a locked position with the first locking member engaging a first tooth racket and the second locking member engaging a second tooth rack and the lever in a set position with an extension shown in phantom in the foreground and the cam-follower mechanism, a roller bearing, and a plurality of washers removed.

As best shown in FIGS. 2 and 3, a first bracket 24 having a pair of first arms 26 is coupled to the column jacket 22. The first bracket 24 includes a base 28 extending substantially parallel to the longitudinal axis L with the first arms 26 extending from the base 28 transverse to the longitudinal axis L. The column jacket 22 may be mounted to the base 28, one of the first arms 26, both of the first arms 26, both the base 28 and one of the first arms 26 or the base 28 and both of the first arms 26. At least one of the first arms 26 defines a telescoping slot 30 extending substantially parallel to the longitudinal axis L with the telescoping slot 30 having a first tooth rack 32. More specifically, each of the first arms 26 define the telescoping slot 30 extending substantially parallel to the longitudinal axis L with the telescoping slot 30 of each of the first arms 26 having the first tooth rack 32.

The telescoping slot 30 of each of the first arms 26 include a first inner face 34 and a second inner face 36 facing each other in a spaced relationship and extending substantially parallel to the longitudinal axis L. The first tooth rack 32 is disposed on the first inner face 34 and extends toward the second inner face 36. More specifically, the first tooth rack 32 extends angularly toward the second inner face 36. The second inner face 36 defines a substantially flat profile extending along the longitudinal axis L. It is to be appreciated that the first tooth rack 32 may be disposed on the second inner face 36 and the substantially flat profile may be disposed on the first inner face 34. It is to be further appreciated that the first tooth rack 32 and the first arms 26 may be integrally formed to each other or may be mounted to each other by welding, fasteners or any other acceptable method known to those of ordinary skill in the art.

The telescoping slot 30 of each of the first arms 26 further include a front inner face 38 and a back inner face 40 facing each other in a spaced relationship and disposed adjacent to and substantially transverse to the first and second inner faces 34, 36. The front inner face 38 defines a maximum forward position the column jacket 22 may move toward the user in the telescoping direction and the back inner face 40 defines a maximum backward position the column jacket 22 may move away from the user in the telescoping direction.

A second bracket 42 is disposed about the first bracket 24 and coupled to the vehicle for supporting the assembly 20. The second bracket 42 includes a pair of second arms 44 extending substantially transverse to the longitudinal axis L. At least one of the second arms 44 defines a tilting slot 46 extending substantially transverse to and spaced from the telescoping slot 30 with the tilting slot 46; having a second tooth rack 48. More specifically, each of the second arms 44 define the tilting slot 46 extending substantially transverse to and spaced from the telescoping slot 30 with the tilting slot 46 of each of the second aims 44 having the second tooth rack 48.

The tilting slot 46 of each of the second arms 44 include a first inner surface 50 and a second inner surface 52 facing each other in a spaced relationship and extends substantially transverse to the longitudinal axis L. The second tooth rack 48 is disposed on the first inner surface 50 and extends toward the second inner surface 52. More specifically, the second tooth rack 48 extends angularly toward the second inner surface 52. The second inner surface 52 defines a substantially flat profile extending transverse to the longitudinal axis L. It is to be appreciated that the second tooth rack 48 may be disposed on the second inner surface 52 and the substantially flat profile may be disposed on the first inner surface 50. It is to be further appreciated that the second tooth rack 48 and the second arms 44 may be integrally formed to each other or may be mounted to each other by welding, fasteners or any other acceptable method known to those of ordinary skill in the art.

The tilting slot 46 of each of the second arms 44 further include an upper inner surface 54 and a lower inner surface 56 facing each other in a spaced relationship and disposed adjacent to and substantially transverse to the first and second inner surfaces 50, 52. The upper inner surface 54 defines a maximum upward position the column jacket 22 may move upwardly relative to the user in the tilting direction and the lower inner surface 56 defines a maximum downward position the column jacket 22 may move downwardly relative to the user in the tilting direction.

The adjustable steering column assembly 20 further includes a pivot shaft 58 defining a pivot axis P substantially transverse to the longitudinal axis L. The pivot shaft 58 is disposed through the first and second arms 26, 44 along the pivot axis P. More specifically, the pivot shaft 58 is disposed through the telescoping and tilting slots 30, 46 of each of the first and second arms 26, 44 along the pivot axis P.

The pivot shaft 58 includes a first end 60 and a second end 62 spaced from each other along the pivot axis P. The first end 60 includes a head 64 extending outwardly away from the pivot axis P and a fastener 65 is secured to the second end 62 for preventing movement of the pivot shaft 58 along the pivot axis P. The fastener 65 is adjustable for changing a clamping load applied to the first and second arms 26, 44. The pivot shaft 58 defines at least one hole, generally shown at 66, extending transverse to the pivot axis P. Typically, the at least one hole 66 is further defined as a first hole 68 and a second hole 70 spaced from each other along the pivot axis P and extending through the pivot shaft 58 transverse to the pivot axis P. The first and second holes 68, 70 may be disposed between the second arms 44 of the second bracket 42. However it is to be appreciated that the first and second holes 68, 70 may be disposed anywhere along the pivot shaft 58.

As only shown in FIG. 2, a cam-follower mechanism 71 is coupled to one of the first and second ends 60, 62 of the pivot shaft 58 for compressing the first and second brackets 24, 42 to provide stiffness to the assembly 20. Typically, the cam-follower mechanism 71 is coupled to the first end 60 of the pivot shaft 58. However it is to be appreciated that the cam-follower mechanism 71 may be coupled to both the first and second ends 60, 62 or coupled to the second end 62 only. When the pivot shaft 58 rotates about the pivot axis P, the pivot shaft 58 also moves slightly along the pivot axis P as the cam-follower mechanism 71 selectively compresses the first and second brackets 24, 42. Cam-follower mechanisms 71 are well known to those of ordinary skill in the art and will not be discussed further. It is to be appreciated that any suitable mechanism may be used to compress the first and second brackets 24, 42, such as for example a face cam or a 3-pin cam.

As only shown in FIG. 2, a roller bearing 73 is coupled to the second end 62 of the pivot shaft 58 adjacent the fastener 65. Roller bearings 73 are well known to those of ordinary skill in the art and will not be discussed further. It is to be appreciated that any other suitable bearing may be utilized instead of a roller bearing 73. Further, as only shown in FIG. 2, a plurality of washers 75 are coupled to the pivot shaft 58. One of the washers 75 is coupled to the first end 60 and disposed between the cam-follower mechanism 71 and one of the second arms 44. An other one of the washers 75 coupled to the second end 62 and disposed between the roller bearing 73 and an other one of the second arms 44. As the cam-follower mechanism 71 moves, the washers 75 selectively compress the first and second brackets 24, 42. Each of the washers 75 define a groove 77 which will be discussed below. It is to be appreciated that a portion of the cam-follower mechanism 71 may be integral with one of the washers 75.

An actuator, generally shown at 72, is coupled to the pivot shaft 58 and movable between a set position for preventing movement of the column jacket 22 in the telescoping and tilting directions and an adjustable position for allowing movement of the column jacket 22 in the telescoping and tilting directions. The actuator 72 is shown in the set position in FIG. 3 and the actuator 72 is shown in the adjustable position in FIGS. 1 and 4. The actuator 72 may be coupled to one of the first and second ends 60, 62 of the pivot shaft 58 and rotates the pivot shaft 58 about the pivot axis P. Typically, the actuator 72 is mounted to the first end 60 of the pivot shaft 58. However it is to be appreciated that the actuator 72 may be mounted anywhere along the pivot shaft 58.

The actuator 72 may be further defined as a lever 74 mounted to the pivot shaft 58 and movable between the set and adjustable positions. The lever 74 extends outwardly away from the pivot shaft 58 for allowing the user to rotate the lever 74 between the set and adjustable positions. It is to be appreciated that the lever 74 and the pivot shaft 58 may be integrally formed to each other or may be mounted to each other by welding, fasteners or any other acceptable method known to those of ordinary skill in the art.

The actuator 72 may also be further defined as a motor (not shown) coupled to the pivot shaft 58 and movable between the set and adjustable positions. Typically, the motor is an electric motor. The motor may be actuated by the user by a push button, a switch, a touch pad or any other device for actuating the motor to move between the set and adjustable positions. The motor may be a single-directional motor, a bi-directional motor or any other acceptable motor known to those of ordinary skill in the art. It is to be further appreciated that the motor may be powered by some source other than electricity.

Figure 4:
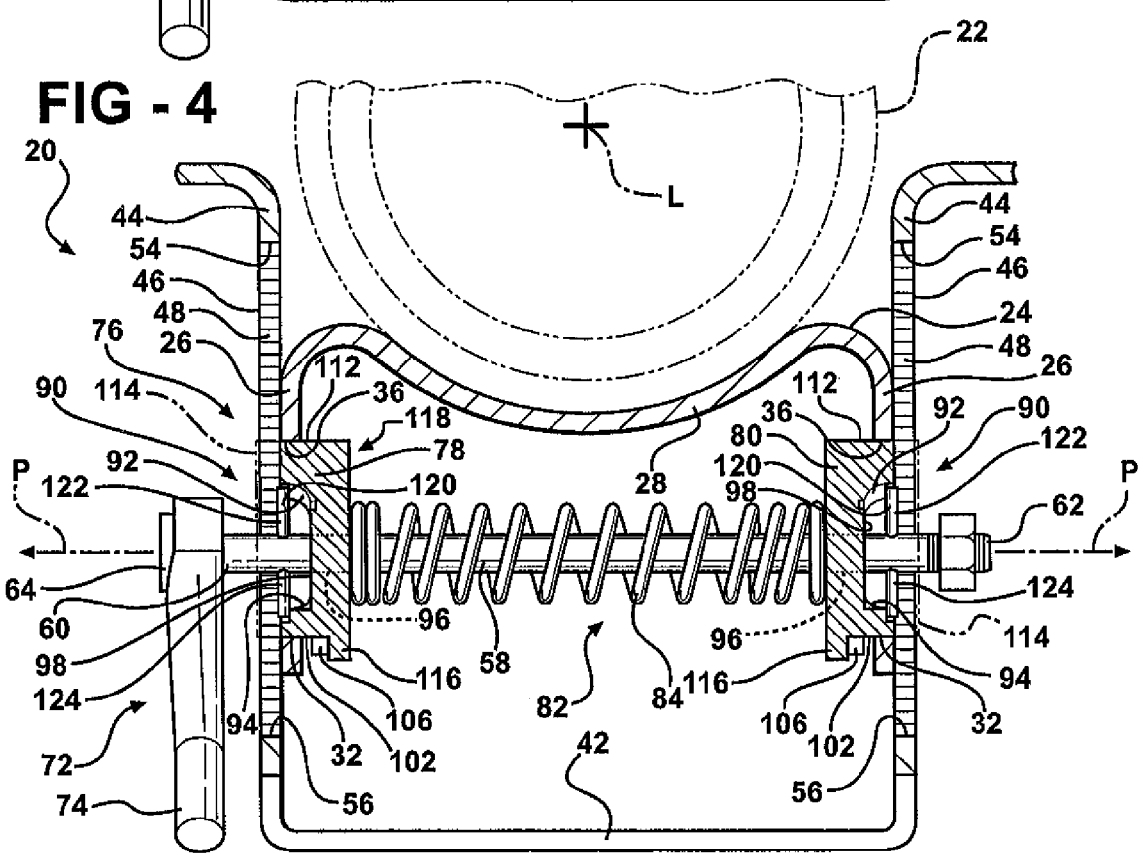
FIG. 4 is a partial cross-sectional view of the adjustable steering column assembly having the first locking member and the second locking member in an unlocked position with the first locking member disengaged from the first tooth racket and the second locking member disengaged from the second tooth rack and the lever in the adjustable position with the extension shown in phantom in the foreground and the cam-follower mechanism, the roller bearing, and the washers removed.

Referring to FIGS. 2-4, a locking member, generally shown at 76, is mounted to the pivot shaft 58 and moveable along the pivot axis P between a locked position for preventing movement of the column jacket 22 in the telescoping and tilting directions and an unlocked position for allowing movement of the column jacket 22 in the telescoping and tilting directions. More specifically, a first locking member 78 and a second locking member 80 are mounted to the pivot shaft 58 and moveable along the pivot axis P between the locked position for preventing movement of the column jacket 22 in the telescoping and tilting directions and the unlocked position for allowing movement of the column jacket 22 in the telescoping and tilting directions. In other words, when in the unlocked position, the first and second locking members 78, 80 are pushed laterally out of engagement with the first and second tooth racks 32, 48 so the column jacket may be adjusted in the telescoping and tilting directions. Additionally, when in the locked position, the first and second locking members 78, 80 are drawn into the telescoping and tilting slots 30, 46 and engage the first and second tooth racks 32, 48 for preventing movement of the column jacket 22 in the telescoping and tilting direction. As shown in FIG. 3, when the actuator 72 is in the set position, the first and second locking members 78, 80 are in the locked position. As shown in FIG. 4, when the actuator 72 is in the adjustable position, the first and second locking members 78, 80 are in the unlocked position. The locking member 76 is further defined as the first locking member 78. It is to be appreciated that the configuration of the first and second locking members 78, 80 are substantially the same. In other words, the first and second locking members 78, 80 are mirror images of each other.

The locking member 76 is mounted to the pivot shaft 58 between the second arms 44 and moveable between the second arms 44 of the second bracket 42. More specifically, the first and second locking members 78, 80 are spaced from each other, mounted to the pivot shaft 58 between the second arms 44, and moveable between the second arms 44 of the second bracket 42. Having the first and second locking members 78, 80 disposed between the second arms 44 provides for a more compact adjustable steering column assembly 20 and protects the first and second locking members 78, 80. However it is to be appreciated that the first and second locking members 78, 80 may be disposed between the first arms 26, outside of the second arms 44 or anywhere along the pivot shaft 58.

A biasing member, generally shown at 82, is coupled to the pivot shaft 58 and disposed between the second arms 44 of the second bracket 42 with the biasing member 82 abutting the locking member 76 for biasing the locking member 76 to the locked position. More specifically, the biasing member 82 is coupled to the pivot shaft 58 and abuts the first and second locking members 78, 80. The biasing member 82 is disposed between the first and second locking members 78, 80 for biasing the first and second locking members 78, 80 away from each other along the pivot axis P to the locked position. The biasing member 82 continuously biases the first and second locking members 78, 80 to the locked position. In other words, the biasing member 82 is compressed between the first and second locking members 78, 80 for applying a load to the first and second locking members 78, 80 to bias the first and second locking members 78, 80 to the locked position. The biasing member 82 may be defined as a spring 84 or any other biasing member known to those of ordinary skill in the art for biasing the first and second locking members 78, 80 to the locked position. It is to be appreciated that more than one biasing member 82 may be utilized and the biasing member 82 may be disposed anywhere along the pivot shaft 58.

Figure 5:
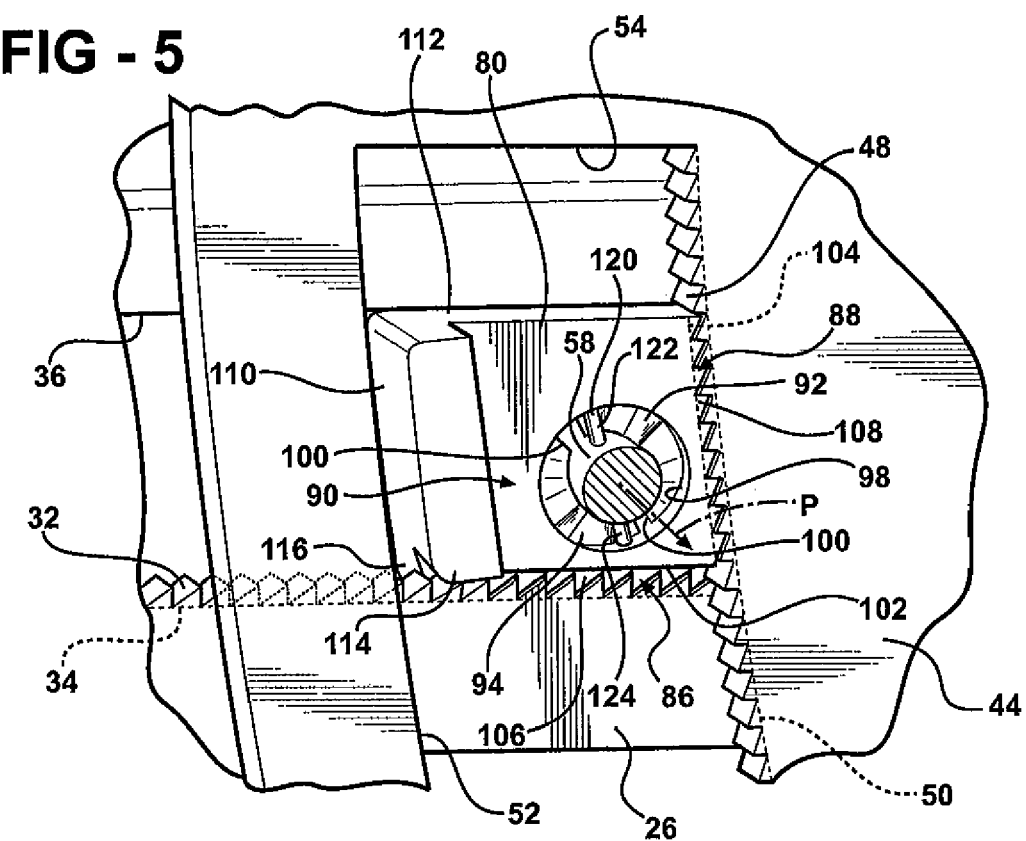
FIG. 5 is a perspective enlarged view of the second locking member engaging the first and second tooth racks in the locked position.

The locking member 76 includes a first locking surface, generally shown at 86, substantially parallel to the longitudinal axis L and a second locking surface, generally shown at 88, substantially transverse to the longitudinal and pivot axes L, P. As shown in FIGS. 3 and 5, the first and second locking surfaces 86, 88 are disposed in the telescoping and tilting slots 30, 46, respectively when in the locked position such that the first locking surface 86 of the locking member 76 engages the first tooth rack 32 and the second locking surface 88 of the locking member 76 engages the second tooth rack 48 for preventing movement of the column jacket 22 in the telescoping and tilting directions. More specifically, the first and second locking members 78, 80 each have the first locking surface 86 substantially parallel to the longitudinal axis L and the second locking surface 88 substantially transverse to the longitudinal and pivot axes L, P. The first and second locking surfaces 86, 88 are disposed in the telescoping and tilting slots 30, 46, respectively when in the locked position such that the first locking surface 86 of each of the first and second locking members 78, 80 engage the first tooth rack 32 of each of the first arms 26 and the second locking surface 88 of each of the first and second locking members 78, 80 engage the second tooth rack 48 of each of the second arms 44 for preventing movement of the column jacket 22 in the telescoping and tilting directions.

Figure 6:
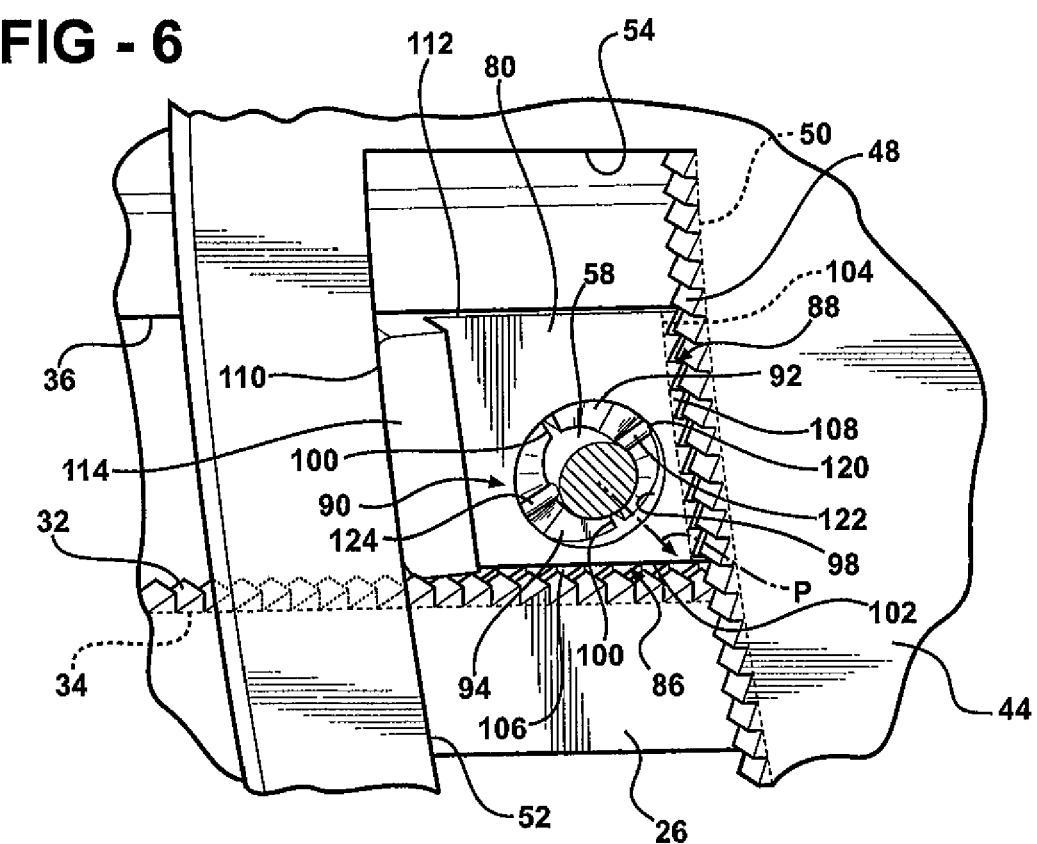
FIG. 6 is a perspective enlarged view of the second locking member disengaged from the first and second tooth racks in the unlocked position.

As shown in FIGS. 4 and 6, the first and second locking surfaces 86, 88 are spaced from the telescoping and tilting slots 30, 46, respectively when in the unlocked position such that the first locking surface 86 disengages from the first tooth rack 32 and the second locking surface 88 disengages from the second tooth rack 48 for allowing movement of the column jacket 22 in the telescoping and tilting directions. More specifically, the first and second locking surfaces 86, 88 are spaced from the telescoping and tilting slots 30, 46, respectively when in the unlocked position such that the first locking surface 86 of each of the first and second locking members 78, 80 disengage from the first tooth rack 32 of each of the first arms 26 and the second locking surface 88 of each of the first and second locking members 78, 80 disengage from the second tooth rack 48 of each of the second arms 44 for allowing movement of the column jacket 22 in the telescoping and tilting directions. In other words, the first tooth rack 32 of each of the first arms 26 are disposed on the first inner face 34 for cooperating with the first locking surface 86 of each of the first and second locking members 78, 80 and the second tooth rack 48 of each of the second arms 44 are disposed on the first inner surface 50 for cooperating with the second locking surface 88 of each of the first and second locking members 78, 80.

Figure 7:
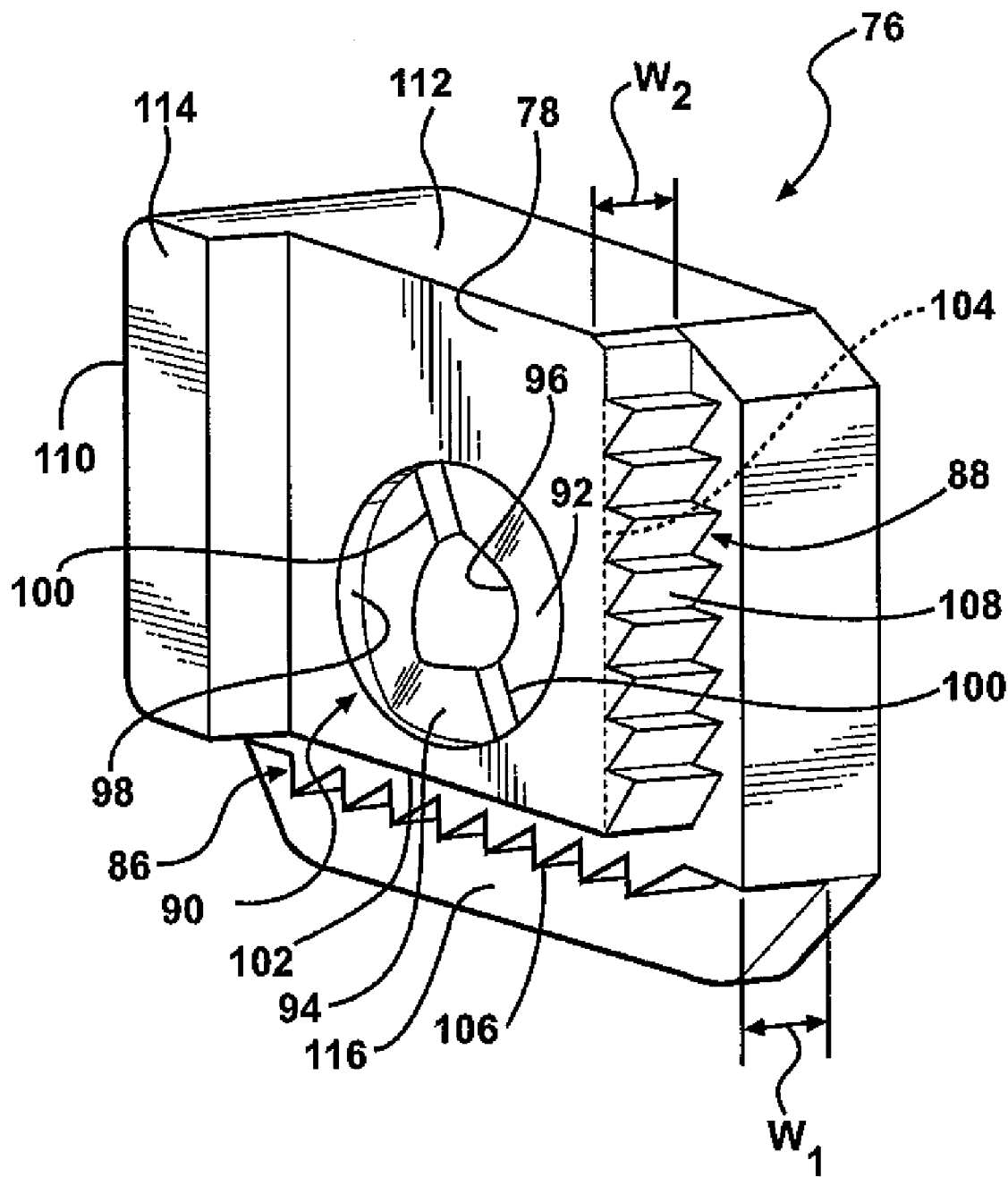
FIG. 7 is a perspective enlarged view of the first locking member.

Also referring to FIG. 7, the locking member 76 includes at least one cam surface, generally shown at 90, adjacent the pivot axis P for moving the locking member 76 along the pivot axis P during movement between the locked and unlocked positions. More specifically, each of the first and second locking members 78, 80 include the cam surface 90 adjacent the pivot axis P for moving the first and second locking members 78, 80 toward each other during movement to the unlocked position and away from each other during movement to the locked position. The at least one cam surface 90 is further defined as a first cam surface 92 and a second cam surface 94 spaced from each other with the first and second cam surfaces 92, 94 adjacent the pivot axis P and will be discussed further below.

The locking member 76 defines an aperture 96 extending along the pivot axis P for receiving the pivot shaft 58 to mount the locking member 76 to the pivot shaft 58. The locking member 76 further defines a recess 98 extending along the pivot axis P adjacent the aperture 96 with the cam surface 90 disposed in the recess 98. More specifically, each of the first and second locking members 78, 80 define the aperture 96 extending along the pivot axis P for receiving the pivot shaft 58 to mount the first and second locking members 78, 80 to the pivot shaft 58. Each of the first and second locking members 78, 80 further define the recess 98 extending along the pivot axis P adjacent the aperture 96 with the cam surface 90 disposed in the recess 98. More specifically, the first and second cam surfaces 92, 94 are disposed in the recess 98 of each of the first and second locking members 78, 80.

The locking member 76 also defines a slot 100 extending along the pivot axis P adjacent the aperture 96 and the recess 98. More specifically, each of the first and second locking members 78, 80 define the slot 100 extending along the pivot axis P adjacent the aperture 96 and the recess 98. The recess 98 and slot 100 will be discussed further below.

The locking member 76 includes a first outer periphery surface 102 substantially parallel the longitudinal axis L and a second outer periphery surface 104 substantially transverse to the first outer periphery surface 102 such that the first outer periphery surface 102 faces the first inner face 34 and the second outer periphery surface 104 faces the first inner surface 50. More specifically, each of the first and second locking members 78, 80 include the first outer periphery surface 102 substantially parallel to the longitudinal axis L and the second outer periphery surface 104 substantially transverse to the first outer periphery surface 102 such that the first outer periphery surface 102 faces the first inner face 34 and the second outer periphery surface 104 faces the first inner surface 50.

The first locking surface 86 of the locking member 76 include a plurality of telescoping teeth 106 disposed on the first outer periphery surface 102 for cooperating with the first tooth rack 32 of the first arm 26. More specifically, the first locking surface 86 of each of the first and second locking members 78, 80 include the telescoping teeth 106 disposed on the first outer periphery surface 102 for cooperating with the first tooth rack 32 of the first arms 26. The telescoping teeth 106 extend angularly outwardly substantially transverse to the longitudinal and pivot axes L, P. More specifically, the telescoping teeth 106 extend angularly toward the first inner face 34. The telescoping teeth 106 and the first tooth rack 32 are configured to cooperate with each other. It is to be appreciated that the telescoping teeth 106 may extend at any orientation as long as the telescoping teeth 106 selectively engage and disengage the first tooth rack 32. Typically, the first outer periphery surface 102 and the telescoping teeth 106 are integrally formed to each other. However it is to be appreciated that the first outer periphery surface 102 and the telescoping teeth 106 may be mounted to each other by welding, fasteners or any other acceptable method known to those of ordinary skill in the art.

The second locking surface 88 of the locking member 76 include a plurality of tilting teeth 108 disposed on the second outer periphery surface 104 for cooperating with the second tooth rack 48 of the second arm 44. More specifically, the second locking surface 88 of each of the first and second locking members 78, 80 include the tilting teeth 108 disposed on the second outer periphery surface 104 for cooperating with the second tooth rack 48 of the second arms 44. The tilting teeth 108 extend angularly outwardly substantially transverse to the longitudinal and pivot axes L, P in a different direction from the telescoping teeth 106. More specifically, the tilting teeth 108 extend angularly toward the first inner surface 50. The tilting teeth 108 and the second tooth rack 48 are configured to cooperate with each other. It is to be appreciated that the tilting teeth 108 may extend at any orientation as long as the telescoping teeth 106 selectively engage the first tooth rack 32 and the tilting teeth 108 selectively engage the second tooth rack 48. Typically, the second outer periphery surface 104 and the tilting teeth 108 are integrally formed to each other. However it is to be appreciated that the second outer periphery surface 104 and the tilting teeth 108 may be mounted to each other by welding, fasteners or any other acceptable method known to those of ordinary skill in the art.

The telescoping teeth 106 extend a predetermined width $W_1$ along the first outer periphery surface 102 and the tilting teeth 108 extend a predetermined width $W_2$ along the second outer periphery surface 104. Typically, the width $W_1$ of the telescoping teeth 106 is less than the entire first outer periphery surface 102 and the width $W_2$ of the tilting teeth 108 is less than the entire second outer periphery surface 104. More typically, the width $W_1$ of the telescoping teeth 106 complement the first tooth rack 32 and the width $W_2$ of the tilting teeth 108 complement the second tooth rack 48. However, it is to be appreciated that the telescoping and tilting teeth 106, 108 may extend the entire first and second outer periphery surfaces 102, 104, respectively.

The telescoping and tilting teeth 106, 108 of each of the first and second locking members 78, 80 are offset from each other a predetermined distance substantially equal to the spacing between the telescoping and tilting slots 30, 46. In other words, the width $W_1$ of the telescoping teeth 106 is offset from the width $W_2$ of the tilting teeth 108. The telescoping and tilting teeth 106, 108 are offset from each other correspondingly to the spacing of the telescoping and tilting slots 30, 46 for allowing simultaneous engaging and disengaging of the telescoping and tilting teeth 106, 108 with the first and second tooth racks 32, 48 when moving between the locked and unlocked positions, respectively. Having the width $W_1$ of the telescoping teeth 106 less than the entire first outer periphery surface 102 and the width $W_2$ of the tilting teeth 108 less than the entire second outer periphery surface 104 and the telescoping teeth 106 offset from the tilting teeth 108 also reduces the amount of rotation of the lever 74. If the telescoping and tilting teeth 106, 108 extended the entire first and second outer periphery surfaces 102, 104 the lever 74 would have to rotate more to selectively engage and disengage from the first and second tooth racks 32, 48, respectively and telescoping and tilting teeth 106, 108 would not simultaneously engage and disengage from the first and second tooth racks 32, 48, respectively.

Each of the first and second locking members 78, 80 include a third outer periphery surface 110 and a fourth outer periphery surface 112 substantially transverse to each other. The third outer periphery surface 110 is substantially parallel to the second outer periphery surface 104 and abuts the second inner surface 52 of the tilting slot 46. The third outer periphery surface 110 includes an extension 114 extending outwardly along the pivot axis P for allowing the third outer periphery surface 110 to continuously abut the second inner surface 52 during movement between the locked and unlocked positions. The groove 77 of one of the washers 75 receives the extension 114 of the first locking member 78 and the groove 77 of another one of the washers 75 receives the extension 114 of the second locking member 80 when in the locked position. In other words, the extension 114 of each of the first and second locking members 78, 90 move through the tilting slot 46 and into the groove 77 of the washers 75 when in the locked position without any interference from the washers 75 as the washers 75 compress the first and second brackets 24, 42. When the first and second locking members 78, 80 move to the unlocked position, the extension 114 of each of the first and second locking members 78, 80 move out of the groove 77 of the washers 75.

The fourth outer periphery surface 112 is substantially parallel to the first outer periphery surface 102 and abuts the second inner face 36 of the telescoping slot 30. The third and fourth outer periphery surfaces 110, 112 prevent rotation of the first and second locking members 78, 80 about the pivot axis P when moving between the locked and unlocked positions. In other words, the third outer periphery surface 110 and extension 114 moves along the second inner surface 52 and the fourth outer periphery surface 112 moves along the second inner face 36 for guiding the first and second locking members 78, 80 along the pivot axis P to selectively engage the telescoping and tilting teeth 106, 108 with the first and second tooth racks 32, 48 while preventing the first and second locking members 78, 80 from rotating about the pivot axis P. However it is to be appreciated that the first and second locking members 78, 80 may be prevented from rotating by any other suitable method.

The first outer periphery surface 102 of each of the first and second locking members 78, 80 include a projection 116 extending outwardly away from the fourth outer periphery surface 112. The projection 116 abuts the first arms 26 adjacent the first tooth rack 32 when in the locked position for limiting movement of the first and second locking members 78, 80 away from each other along the pivot axis P. More specifically, the projection 116 of the first locking member 78 abuts one of the first arms 26 adjacent the first tooth rack 32 and the projection 116 of the second locking member 80 abuts another one of the first arms 26 adjacent the first tooth rack 32 when in the locked position for ensuring that the telescoping and tilting teeth 106, 108 stop in alignment with the first and second tooth racks 32, 48, respectively. If the first and second locking members 78, 80 moved too far away from each other then the telescoping and tilting teeth 106, 108 would move out of the telescoping and tilting slots 30, 46 and would not engage with the first and second tooth racks 32, 48, respectively. The projection 116 of each of the first and second locking members 78, 80 and the first outer periphery surface 102 may be integrally formed to each other or may be mounted to each other by welding, fasteners or any acceptable method known to those of ordinary skill in the art. It is to be appreciated that each of the first and second locking members 78, 80 may include any other suitable stop for limiting movement of the first and second locking members 78, 80.

Referring to FIGS. 2-6, at least one pin follower, generally shown at 118, is mounted to the pivot shaft 58 and moveable along the cam surface 90 of the locking member 76 during rotation of the pivot shaft 58 about the pivot axis P for moving the locking member 76 toward and away from the telescoping and tilting slots 100. Moving the locking member 76 toward and away from the telescoping and tilting slot 30, 46 along the pivot axis P allows the first and second locking members 78, 80 to selectively engage and disengage with the first and second tooth racks 32, 48, respectively. It is to be appreciated that other suitable mechanisms or components other than the pin follower 118 may be used to move the locking member 76 toward and away from the telescoping and tilting slot 30, 46 along the pivot axis P, such as for example a cam and/or a lever.

The at least one pin follower 118 is further defined as a plurality of pin followers 120 spaced from each other. The pin followers 120 are mounted to the pivot shaft 58 with one of the pin followers 120 moveable along the cam surface 90 of the first locking member 78 and an other one of the pin followers 120 moveable along the cam surface 90 of the second locking member 80 during rotation of the pivot shaft 58 about the pivot axis P. Having the biasing member 82 continuously biasing the first and second locking members 78, 80 to the locked position causes the cam surface 90 of the first and second locking members 78, 80 to continuously engage respective pin followers 120. In other words, the biasing member 82 applies the load to the first and second locking members 78, 80 which causes the cam surface 90 of the first and second locking members 78, 80 to engage the pin followers 120 to maintain continuously contact between the cam surface 90 and the pin followers 120 for moving the first and second locking members 78, 80 between the locked and unlocked positions. The first and second locking members 78, 80 move toward and away from each other to selectively engage and disengage the first and second locking surfaces 86, 88 with the first and second tooth racks 32, 48, respectively. More specifically, the first and second locking members 78, 80 move toward each other to disengage from the first and second tooth racks 32, 48 when in the unlocked position and the first and second locking members 78, 80 move away from each other to engage the first and second tooth racks 32, 48 when in the locked position. It is to be appreciated that the first and second locking members 78, 80 may move away from each other to disengage from the first and second tooth racks 32, 48 and may move toward each other to engage the first and second tooth racks 32, 48. The first and second locking members 78, 80 only move along the pivot axis P for allowing only one degree of freedom.

The pin follower 118 is mounted to the hole 66 of the pivot shaft 58. More specifically, one of the pin followers 120 are mounted in the first hole 68 and the other one of the pin followers 120 are mounted to the second hole 70 such that each of the pin followers 120 define a first portion 122 and a second portion 124 extending outwardly away from the pivot shaft 58. The first and second portions 122, 124 extend substantially transverse the pivot axis P such that the first portion 122 moves along the first cam surface 92 and the second portion 124 moves along the second cam surface 94. It is to be appreciated that the second portion 124 of the pin followers 120 are optional. It is to be further appreciated that the pin followers 120 and the pivot shaft 58 may be integrally formed to each other or may be mounted to each other by welding, fasteners or any other method known to those of ordinary skill in the art.

The pin follower 118 is disposed in the recess 98 and the recess 98 is configured to allow the pin follower 118 to rotate about the pivot axis P along the cam surface 90. More specifically, the pin followers 120 are disposed in the recess 98 and the recess 98 is configured to allow the pin followers 120 to rotate about the pivot axis P along the cam surface 90. In other words, the first and second portions 122, 124 of each of the pin followers 120 are disposed in the recess 98 with the recess 98 configured to allow the first and second portions 122, 124 to rotate about the pivot axis P along the first and second cam surfaces 92, 94, respectively. The recess 98 of each of the first and second locking members 78, 80 protects the pin followers 120 and the cam surface 90 from debris, dirt or any other miscellaneous particles. Further, the recess 98 protects the pin followers 120 and the cam surface 90 from damage during production. The slot 100 is configured to complement the pin followers 120 for allowing the pin followers 120 to slide through the slot 100 and into the recess 98 to mount the first and second locking members 78, 80 to the pivot shaft 58. More specifically, the slot 100 is configured to receive the first and second portions 122, 124 of each of the pin followers 120.

For illustrative purposes only, an example of the first and second locking members 78, 80 moving between the locked and unlocked positions and the lever 74 moving between the set and adjustable positions is discussed below. When the lever 74 is rotated from the set position to the adjustable position, the pivot shaft 58 rotates about the pivot axis P in a first direction which causes the pin followers 120 to rotate about the pivot axis P in the first direction and move along the cam surface 90 of each of the first and second locking members 78, 80. More specifically, the first and second portions 122, 124 of one of the pin followers 120 moves along the first and second cam surfaces 92, 94 of the first locking member 78 in the first direction and the first and second portions 122, 124 of the other one of the pin followers 120 moves along the first and second cam surfaces 92, 94 of the second locking member 80 also in the first direction. The biasing member 82 continuously biases the first and second locking members 78, 80 away from each other such that the first and second cam surfaces 92, 94 of each of the first and second locking members 78, 80 continuously engage the first and second portions 122, 124 of the pin followers 120 as the pin followers 120 rotate about the pivot axis P which causes the first and second locking members 78, 80 to move toward each along the pivot axis P. The biasing member 82 compresses more as the first and second locking members 78, 80 move toward each other due to the biasing member 82 being disposed between the first and second locking members 78, 80. The third outer periphery surface 110 of each of the first and second locking members 78, 80 moves along the second inner surface 52 of the tilting slot 46 of each of the second arms 44 while the fourth outer periphery surface 112 of each of the first and second locking members 78, 80 moves along the second inner face 36 of the telescoping slot 30 of each of the second arms 44. The telescoping teeth 106 of the first and second locking members 78, 80 move along the pivot axis P and disengage from the first tooth rack 32 of each of the first arms 26 and simultaneously the tilting teeth 108 of the first and second locking members 78, 80 move along the pivot axis P and disengage from the second tooth rack 48 of each of the second arms 44. Each of the first and second locking members 78, 80 move along the pivot axis P toward each other such that the telescoping teeth 106 are disposed between the first arms 26 of the first bracket 24 and the tilting teeth 108 are disposed between the second arms 44 when in the unlocked position. However it is to be appreciated that the tilting teeth 108 may be disposed between the first arms 26, disposed in the space between the first and second slots 100, disposed in the telescoping slot 30 of each of the first arms 26 or any other acceptable position for disengaging the tilting teeth 108 from the second tooth rack 48. It is to be further appreciated that the telescoping teeth 106 may be disposed in any other acceptable position for disengaging the telescoping teeth 106 from the first tooth rack 32. The projection 116 of each of the first and second locking members 78, 80 is spaced from the telescoping slot 30 of each of the first arms 26 and the extension 114 abuts the second inner surface 52 when in the unlocked position. Thus the first and second locking members 78, 80 are in the unlocked position and the column jacket 22 may be adjusted in the telescoping and tilting directions.

When the lever 74 is rotated from the adjustable position to the set position, the pivot shaft 58 rotates about the pivot axis P in a second direction which causes the pin followers 120 to rotate about the pivot axis P in the second direction and move along the cam surface 90 of each of the first and second locking members 78, 80. Typically, the first and second directions are opposite each other. In other words, if the first direction is clockwise, then the second direction is counter-clockwise. The first and second portions 122, 124 of one of the pin followers 120 move along the first and second cam surfaces 92, 94 of the first locking member 78 in the second direction and the first and second portions 122, 124 of the other one of the pin followers 120 moves along the first and second cam surfaces 92, 94 of the second locking member 80 also in the second direction. The first and second locking members 78, 80 move away from each along the pivot axis P while the biasing member 82 continuously biases the first and second locking members 78, 80 to the locked position such that the first and second cam surfaces 92, 94 of each of the first and second locking members 78, 80 continuously engage the first and second portions 122, 124 of the pin followers 120 as the pin followers 120 rotate about the pivot axis P. The biasing member 82 compresses less as the first and second locking members 78, 80 move away from each other. The third outer periphery surface 110 and the extension 114 of each of the first and second locking members 78, 80 moves along the second inner surface 52 of the tilting slot 46 of each of the second arms 44 while the fourth outer periphery surface 112 of each of the first and second locking members 78, 80 moves along the second inner face 36 of the telescoping slot 30 of each of the second arms 44. The telescoping teeth 106 of the first and second locking members 78, 80 move along the pivot axis P and engage the first tooth rack 32 of each of the first arms 26 and simultaneously the tilting teeth 108 of the first and second locking members 78, 80 move along the pivot axis P and engage the second tooth rack 48 of each of the second arms 44. Each of the first and second locking members 78, 80 move along the pivot axis P away from each other such that the telescoping teeth 106 are disposed in the telescoping slot 30 of each of the first arms 26 and the tilting teeth 108 are disposed in the tilting slot 46 of the second arms 44 when in the locked position. The projection 116 of each of the first and second locking members 78, 80 abuts the first arms 26 adjacent the telescoping slot 30 for limiting movement of the first and second locking members 78, 80 away from each other. Thus the first and second locking members 78, 80 are in the locked position and the column jacket 22 is prevented from moving in the telescoping and tilting directions.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An adjustable steering column assembly for a vehicle, said assembly comprising:

a column jacket defining a longitudinal axis and moveable in a telescoping direction and a tilting direction;

a first bracket having a pair of first arms coupled to said column jacket with each of said first arms defining a telescoping slot extending substantially parallel to said longitudinal axis with said telescoping slot having a first tooth rack;

a second bracket disposed about said first bracket and having a pair of second arms each defining a tilting slot extending substantially transverse to and spaced from said telescoping slot with said tilting slot having a second tooth rack;

a pivot shaft defining a pivot axis substantially transverse to said longitudinal axis with said pivot shaft disposed through said telescoping and tilting slots of each of said first and second arms along said pivot axis;

a first locking member and a second locking member mounted to said pivot shaft and moveable along said pivot axis between a locked position for preventing movement of said column jacket in said telescoping and tilting directions and an unlocked position for allowing movement of said column jacket in said telescoping and tilting directions; and said first and second locking members each having a first locking surface substantially parallel to said longitudinal axis and a second locking surface substantially transverse to said longitudinal and pivot axes with said first and second locking surfaces disposed in said telescoping and tilting slots, respectively when in said locked position such that said first locking surface of each of said first and second locking members engage said first tooth rack of each of said first arms and said second locking surface of each of said first and second locking members engage said second tooth rack of each of said second arms for preventing movement of said column jacket in said telescoping and tilting directions; wherein each of said first and second locking members include an inner surface and an opposite outer surface, wherein each of said inner surfaces face each other, said inner and said opposite outer surfaces are located in a plane transverse to said pivot axis; at least one cam surface located on each of said opposite outer surfaces.

2. An assembly as set forth in claim 1 further including a plurality of pin followers mounted to said pivot shaft with one of said pin followers moveable along said cam surface of said first locking member and an other one of said pin followers moveable along said cam surface of said second locking member during rotation of said pivot shaft about said pivot axis for moving said first and second locking members toward and away from each other.

3. An assembly as set forth in claim 2 wherein each of said first and second locking members define an aperture extending along said pivot axis for receiving said pivot shaft with each of said first and second locking members defining a recess extending along said pivot axis adjacent said aperture with said pin followers and said cam surface disposed in said recess and said recess configured to allow said pin followers to rotate about said pivot axis along said cam surface.

4. An assembly as set forth in claim 1 wherein said telescoping slot of each of said first arms include a first inner face and a second inner face facing each other in a spaced relationship with said first tooth rack disposed on said first inner face and extending toward said second inner face for cooperating with said first locking surface of each of said first and second locking members.

5. An assembly as set forth in claim 4 wherein said tilting slot of each of said second arms include a first inner surface and a second inner surface facing each other in a spaced relationship with said second tooth rack disposed on said first inner surface and extending toward said second inner surface for cooperating with said second locking surface of each of said first and second locking members.

6. An assembly as set forth in claim 5 wherein each of said first and second locking members include a first outer periphery surface substantially parallel to said longitudinal axis and a second outer periphery surface substantially transverse to said first outer periphery surface such that said first outer periphery surface faces said first inner face and said second outer periphery surface faces said first inner surface.

7. An assembly as set forth in claim 6 wherein said first locking surface of each of said first and second locking members include a plurality of telescoping teeth disposed on said first outer periphery surface for cooperating with said first tooth rack of said first arms and said second locking surface of each of said first and second locking members include a plurality of tilting teeth disposed on said second outer periphery surface for cooperating with said second tooth rack of said second arms with said telescoping and tilting teeth offset from each other a predetermined distance substantially equal to said spacing between said telescoping and tilting slots.

8. An assembly as set forth in claim 6 wherein each of said first and second locking members include a third outer periphery surface and a fourth outer periphery surface substantially transverse to each other with said third outer periphery surface substantially parallel to said second outer periphery surface and said fourth outer periphery surface substantially parallel to said first outer periphery surface with said third outer periphery surface abutting said second inner surface of said tilting slot and said fourth outer periphery surface abutting said second inner face of said telescoping slot for preventing rotation of said first and second locking members about said pivot axis when moving between said locked and unlocked positions.

9. An assembly as set forth in claim 8 wherein said first outer periphery surface of each of said first and second locking members include a projection extending outwardly away from said fourth outer periphery surface with said projection abutting said first arms adjacent said first tooth rack when in said locked position for limiting movement of said first and second locking members away from each other along said pivot axis.

10. An assembly as set forth in claim 1 further including a biasing member coupled to said pivot shaft and abutting said first and second locking members with said first and second locking members moveable between said second arms of said second bracket and spaced from each other along said pivot axis such that said biasing member is disposed between said first and second locking members for biasing said first and second locking members away from each other along said pivot axis to said locked position.

11. An assembly as set forth in claim 1 further including an actuator coupled to said pivot shaft and movable between a set position for preventing movement of said column jacket in said telescoping and tilting directions and an adjustable position for allowing movement of said column jacket in said telescoping and tilting directions.

12. An adjustable steering column assembly for a vehicle, said assembly comprising:
a column jacket defining a longitudinal axis and moveable in a telescoping direction and a tilting direction;
a first bracket having a pair of first arms coupled to said column jacket with at least one of said first arms defining a telescoping slot extending substantially parallel to said longitudinal axis with said telescoping slot having a first tooth rack;
a second bracket disposed about said first bracket and having a pair of second arms with at least one of said second arms defining a tilting slot extending substantially transverse to and spaced from said telescoping slot with said tilting slot having a second tooth rack;
a pivot shaft defining a pivot axis substantially transverse to said longitudinal axis with said pivot shaft disposed through said first and second arms along said pivot axis;
a locking member mounted to said pivot shaft and moveable along said pivot axis between a locked position for preventing movement of said column jacket in said telescoping and tilting directions and an unlocked position for allowing movement of said column jacket in said telescoping and tilting directions; and
said locking member having a first locking surface substantially parallel to said longitudinal axis and a second locking surface substantially transverse to said longitudinal axis and said pivot axis with said first and second locking surfaces disposed in said telescoping and tilting slots, respectively when in said locked position such that said first locking surface of said locking member engages said first tooth rack and said second locking surface of said locking member engages said second tooth rack for preventing movement of said column jacket in said telescoping and tilting directions wherein said locking member includes an inner surface and an opposite outer surface, wherein said inner surface is facing an area disposed between said pair of second arms, said inner and said opposite outer surface are located in a plane transverse to said pivot axis; at least one cam surface located on said opposite outer surface, said at least one cam surface is adjacent said pivot axis for moving said locking member along said pivot axis during movement between said locked and unlocked positions.

13. An assembly as set forth in claim 12 further including at least one pin follower mounted to said pivot shaft and moveable along said cam surface of said locking member during rotation of said pivot shaft about said pivot axis for moving said locking member toward and away from said telescoping and tilting slots.

14. An assembly as set forth in claim 13 wherein said locking member defines an aperture extending along said pivot axis for receiving said pivot shaft and defining a recess extending along said pivot axis adjacent said aperture with said pin follower and said cam surface disposed in said recess and said recess configured to allow said pin follower to rotate about said pivot axis along said cam surface.

15. An assembly as set forth in claim 12 wherein said telescoping slot of said first arm includes a first inner face and a second inner face facing each other in a spaced relationship with said first tooth rack disposed on said first inner face and extending toward said second inner face for cooperating with said first locking surface of said locking member and wherein said tilting slot of said second arm includes a first inner surface and a second inner surface facing each other in a spaced relationship with said second tooth rack disposed on said first inner surface and extending toward said second inner surface for cooperating with said second locking surface of said locking member.

16. An assembly as set forth in claim 15 wherein said locking member includes a first outer periphery surface substantially parallel said longitudinal axis and a second outer periphery surface substantially transverse to said first outer periphery surface such that said first outer periphery surface faces said first inner face and said second outer periphery surface faces said first inner surface.

17. An assembly as set forth in claim 16 wherein said first locking surface of said locking member include a plurality of telescoping teeth disposed on said first outer periphery surface for cooperating with said first tooth rack of said first arm and said second locking surface of said locking member include a plurality of tilting teeth disposed on said second outer periphery surface for cooperating with said second tooth rack of said second arm with said telescoping and tilting teeth offset from each other a predetermined distance substantially equal to said spacing between said telescoping and tilting slots.

18. An assembly as set forth in claim 12 further including a biasing member coupled to said pivot shaft and disposed between said second arms of said second bracket with said locking member moveable between said second arms and said biasing member abutting said locking member for biasing said locking member to said locked position.

* * * * *